Patented Aug. 9, 1927.

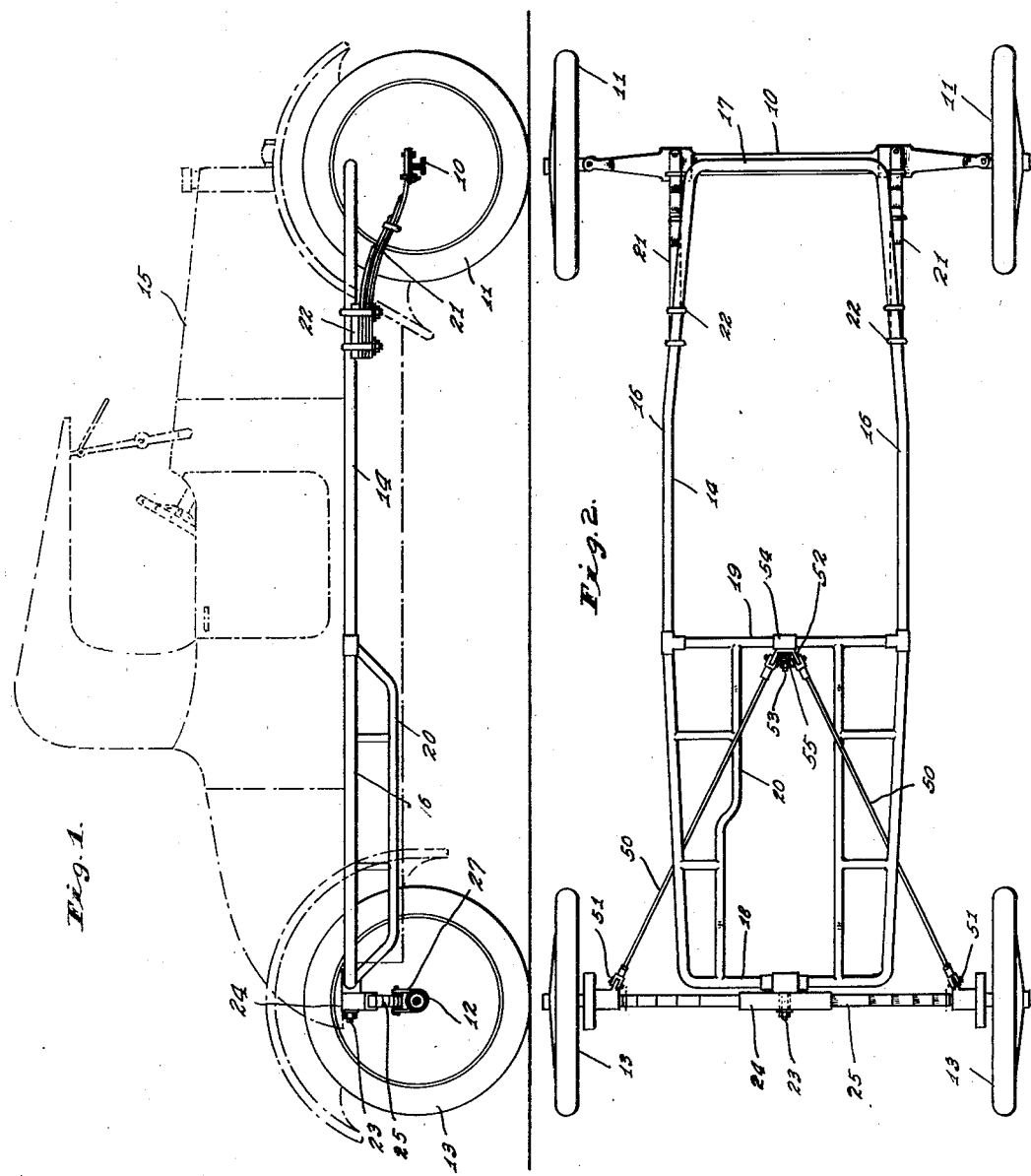

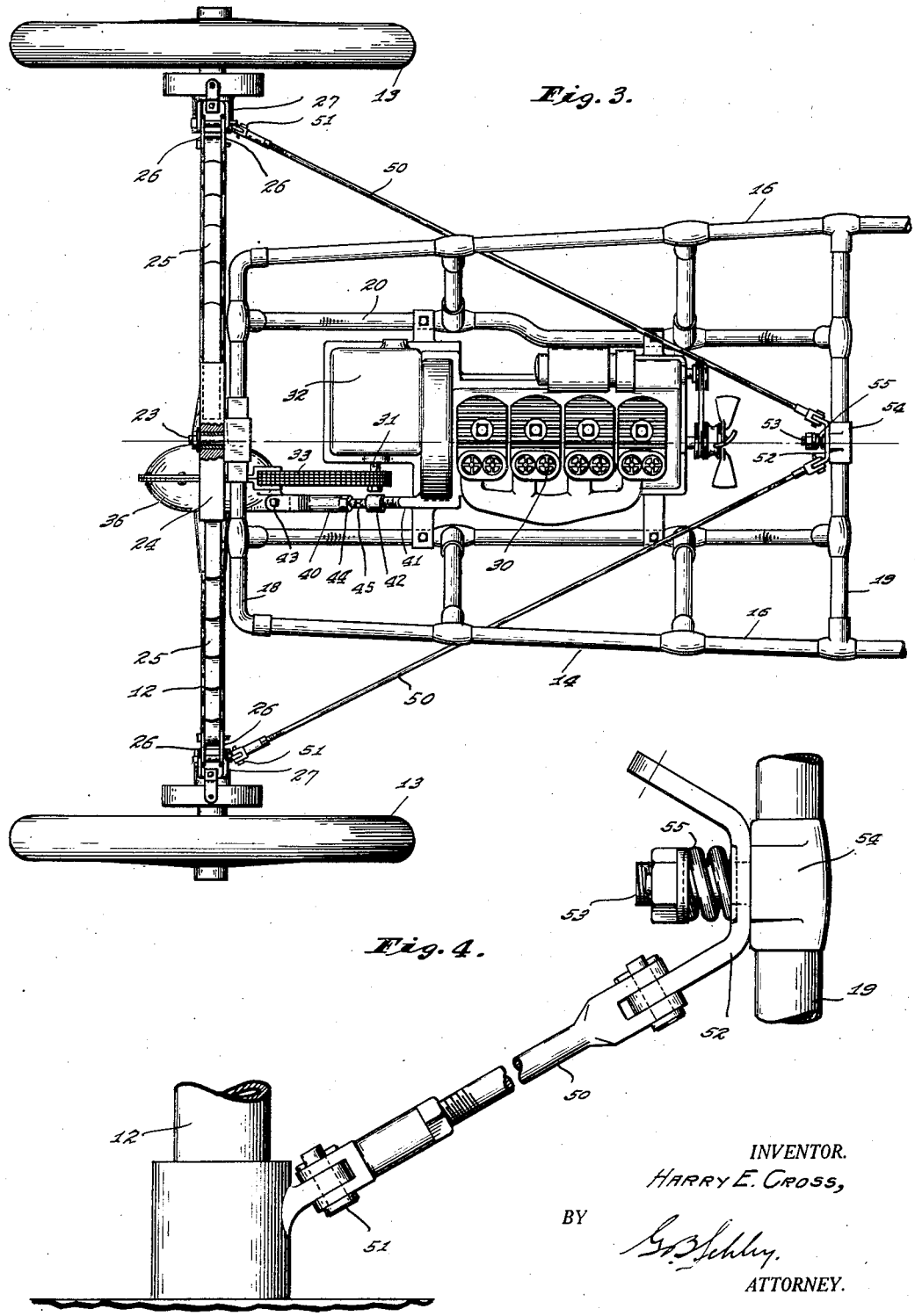

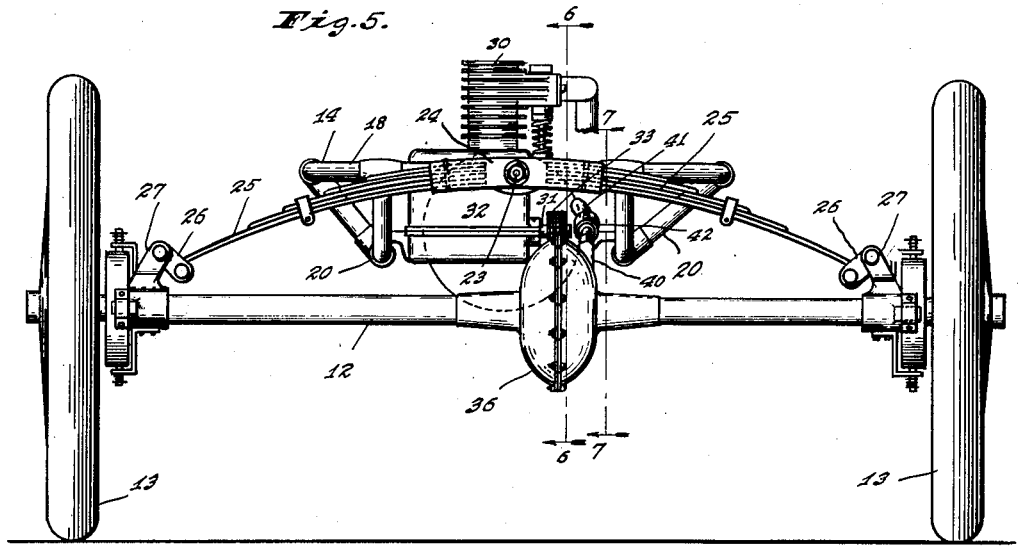
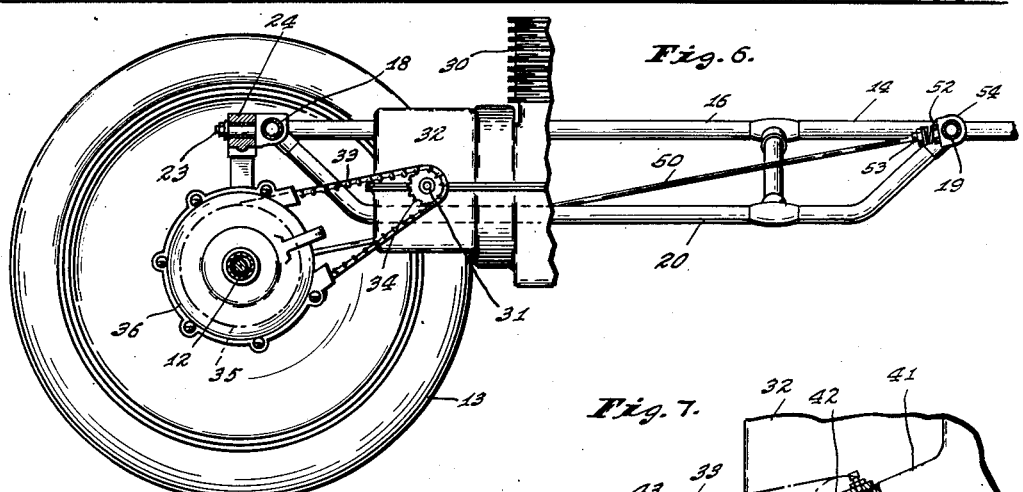
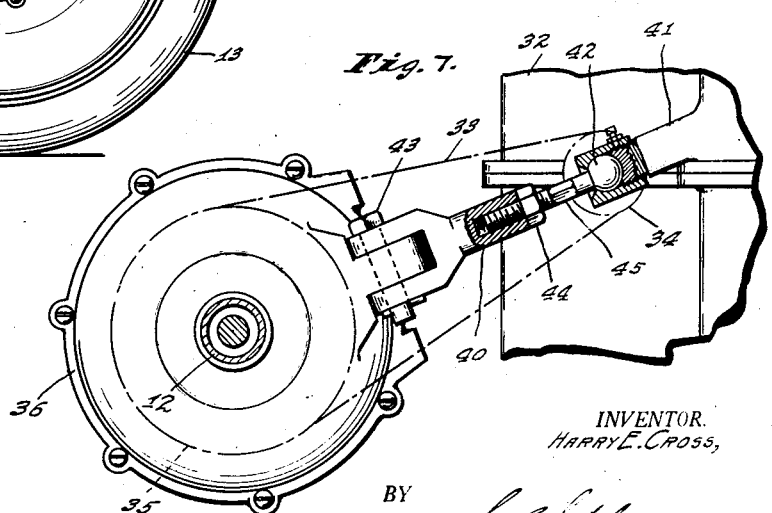

1,638,292

UNITED STATES PATENT OFFICE.

HARRY E. CROSS, OF INDIANAPOLIS, INDIANA, ASSIGNOR TO CROSS MOTOR CORPORATION, OF INDIANAPOLIS, INDIANA, A CORPORATION OF DELAWARE.

AUTOMOBILE CHASSIS.

Application filed October 27, 1923. Serial No. 671,093.

It is the object of my invention to produce a light but strong automobile chassis, with a three-point support for the frame, and with a drive from the rear axle to the frame which will be simple and effective and substantially free from distorting stresses.

The acompanying drawing illustrates my invention: Fig. 1 is a side elevation of an automobile chassis embodying my invention, with a simple body indicated thereon in chain lines; Fig. 2 is a plan of such chassis; Fig. 3 is a plan on a larger scale of the rear end of such chassis, with some parts broken away; Fig. 4 is a plan of the mounting of one of the radius rods, with the rod itself partly broken away; Fig. 5 is a rear elevation of the chassis; Fig. 6 is a partial section on the line 6—6 of Fig. 5; and Fig. 7 is a partial section on the line 7—7 of Fig. 5.

The front axle 10 with its knuckle-mounted guiding wheels 11, and the rear axle 12 with its driving wheels 13, may be of any suitable construction, and carrying the frame 14 on which there may be any suitable body 15. Such body is shown as a runabout body, but by way of example only. The frame 14 is preferably made of tubular members, including main side members 16, a front cross-member 17, a rear cross-member 18, and one or more intermediate cross-members 19; and at the rear end it carries a sub-frame 20, also preferably formed of tubular members, hung rigidly from the main frame between the side members 16 and the cross-members 18 and 19 preferably depressed below the plane of the main frame 14.

The frame 14 is mounted on the axles 10 and 12 on a three-point support, with springs interposed between the frame and the axles. Two of the three points of the three-point support are near the front end of the frame 14, while the third point is at the rear end of the frame, in the longitudinal axis thereof. The two supporting points at the front are shown as provided by quarter-elliptical leaf-springs 21, the forwards ends of which rest on the axle 10 and are suitably fastened thereto at points near the ends of the axle, while the rear ends of such springs are clamped to the side members 16 of the frame by suitable clamps 22, conveniently located some distance back of the front cross-member, so that the latter may be about over the axle 10. The third point of the three-point support is at the rear of the frame 14, in the longitudinal axis of the frame. There the frame is provided with a rearwardly extending trunnion-pin 23 from a block 24 on the rear cross-member 18, which trunnion-pin 23 has a suitable pivotal mounting in a block 24 which receives the adjacent ends of two co-planar quarter-elliptic springs 25 which have their outer ends hung by links 26 from suitable perches 27 on the rear axle 12. The two quarter-elliptic springs 25 with their interconnecting block 24 form in effect a semi-elliptic spring vertically above the rear axle 12. This mounting permits the rear axle 12 to pivot in a vertical plane relatively to the front axle and the frame, without distorting either the frame or the springs 21 and 25.

The power for driving is obtained from a motor 30, usually an internal combustion engine, which is carried by and within the sub-frame 20. This motor may be of any sort, and in any suitable way supplies power to a transverse driving shaft 31; though this driving shaft 31 need not be and usually is not the main shaft of the motor. The main motor-shaft and the driving shaft 31 are usually connected through some interposed change-speed gearing 32. The shaft 31 is connected by a chain 33 and suitable sprockets 34 and 35 to the differential 36, which may be of any suitable construction and has only its outer casing shown. The differential is a part of the rear axle assembly which also includes the axle housing in which the axle turns. The rear axle assembly may be of any suitable or preferred construction.

The main driving thrust from the rear axle 12 to the frame 14 is by a thrust-rod 40, which extends from the casing of the differential 36 or other convenient point on the rear axle 12 to a thrust-receiving lug 41 suitably carried by the frame or some part thereon. As shown, the thrust-receiving lug 41 is part of the motor 30, which in turn is rigidly mounted on the sub-frame 20 in any convenient way. The thrust-rod 40 has a ball-and-socket or other suitable universal joint connection 42 to the thrust-receiving lug 41, and a pivotal connection 43 to the casing of the differential 36. The axis of the pivotal connection 43 is in a normally vertical plane and approximately perpendicular to the thrust-rod itself. The thrust-rod is preferably adjustable in length, as by being formed of two parts one of which screws into the other, with a lock-nut 44 for holding the desired adjustment. The male threaded member is provided with a square portion 45 by which a wrench may grip it for obtaining the desired adjustment. The thrust-rod 40 is preferably quite close to the plane of the chain 33 and sprockets 34 and 35; and the center of the ball-and-socket joint 42 is on the axis of the driving shaft 31. It will be noted that the thrust rod 40, bifurcated at its rear end to fit over a lug on the differential case, has a hinge-joint with said lug providing comparatively broad, flat bearing faces in planes at right angles to the axis of the pivot bolt 43 and parallel with the rod itself. This construction, or the equivalent, in combination with the single point pivotal suspension between the rear axle assembly and the frame are important features of my invention for the reason that the propelling thrust is properly transmitted through the thrust-rod under all conditions and the hinge-joint connection between the thrust-rod and rear axle assembly compensates for both the vertical movement of the rear axle assembly with respect to the frame resulting from the spring action and also the tilting movement of the rear axle assembly about the single rear point suspension as a result of traveling over irregular ground.

While the main thrust from the rear axle to the frame is transmitted through the thrust-rod 40, I also provide oblique radius rods 50. The rear ends of these are connected by pivotal connections 51 to points on the rear axle 12 near the outer ends of the latter. The radius rods converge forwardly, so that their front ends are close together and close to the longitudinal axis of the frame; and such frame ends are connected by pivotal connections to obliquely rearwardly extending ears on a swing-plate 52 mounted on the cross-member 19 at about the middle thereof. The swing-plate 52 is pivotally mounted on a pivot-pin 53 extending rearwardly from an abutment-block 54 fixed on the cross-member 19, and has a soiled forward bearing on said abutment-block; but it is only resiliently held against the abutment-block 54, by a spring 55 surrounding the pivot-pin 53 and acting between the swing-plate and a nut on the rear end of such pivot-pin. This spring 55 may yield to permit rearward movement of the swing-plate 52 away from the abutment-block 54. Such rearward movement may occur in operation, and relieves strain on the parts; as when the rear axle 12 turns on the trunion-pin 23 with relation to the frame 14 and a tension stress is created on one of the radius rods 50, which pulls the swing-plate 52 slightly backward against the spring 55. This backward movement of the swing-plate may also occur in mere movements of the rear spring 25, because the connections of the front ends of the radius rods 50 to the swing plate 52 are necessarily out of line with the common transverse axis of the shaft 31 and the ball-and-socket joint 42.

Attention is directed to the combination of the engine support and the frame support the purpose of which is to secure a most desirable distribution of the weight, reduce the number of parts, reduce vibration and secure better riding qualities. It will be noted that by reason of the three-point support of the frame described above and the location of the engine in the rear of the frame, the front wheels will ride easily over obstructions, without the shock common to the conventional automobile in which the engine weight is directly on the front wheels. Furthermore, the arrangement of the motor in the rear part of the frame as disclosed has a stabilizing effect which is particularly desirable in a light car of the kind contemplated by my invention; and this in combination with the single point support of the rear end of the frame which equalizes the vertical lift of the frame when passing over unequal obstructions, tends to minimize vibration and shock and to produce easy riding qualities.

I claim as my invention:—

1. An automobile comprising, in combination, a frame, a front axle and its guiding wheels, an elliptic type leaf-spring connected to each side member of the frame and to the front axle, a rear axle assembly and its driving wheels, two quarter-elliptic leaf-springs arranged transversely of the frame at the rear thereof and attached at their outer ends to the rear axle assembly, a pivotal connection between the rear springs and the rear cross-member of the frame on a horizontal axis centrally on said rear member, said front and rear springs providing a three-point support for the frame, and an engine mounted in the rear portion of the frame and having a driving connection with the rear axle.

2. An automobile chassis, comprising a front axle, a rear axle, a frame supported upon said axles, springs interposed between said frame and said axles, said frame having a three-point support on the springs with two points thereof at the front and one at the rear, an engine mounted in the rear part of the frame and having a driving connection with the rear axle, and a thrust-rod between the rear axle and the frame, the thrust-rod having a universal-joint connection with the frame and a hinge-joint at the rear thereof with the hinge axis in a vertical plane and transverse to the thrust-rod.

3. An automobile chassis, comprising a front axle, a rear axle, a frame supported upon said axles, springs interposed between said frame and said axles, said frame having a three-point support on the springs with two points thereof at the front and one at the rear, an engine mounted in the rear part of the frame and having a driving connection with the rear axle, and a thrust-rod between the rear axle and the frame, the thrust-rod having a universal-joint connection with the frame and a hinge-joint at the rear with the hinge axis in a vertical plane and transverse to the thrust-rod, the engine having a transverse driving shaft coaxial with the said universal-joint.

4. An automobile chassis, comprising a front axle, a rear axle, a frame supported upon said axles, springs interposed between said frame and said axles, said frame having a three-point support on the springs with two points thereof at the front and one at the rear, an engine mounted in the rear part of the frame and having a driving connection with the rear axle, a thrust-rod between the rear axle and the frame, the thrust-rod having a universal-joint connection with the frame and a hinge-joint at the rear with the hinge axis in a vertical plane, a transverse driving shaft coaxial with the said universal-joint, and a driving chain connecting said driving shaft and the rear axle.

5. In an automobile, in combination, a frame, a rear axle assembly including axle housing and differential, means pivotally supporting the rear end of the frame on the axle housing from a single point centrally between the sides of the frame whereby the rear axle assembly may tilt on said pivotal point, an engine mounted in the rear portion of the frame, a driving connection between the engine and differential permitting the rear axle assembly to move vertically with respect to the frame and to tilt about said point of support, and a thrust-rod between the rear axle assembly and the frame having a joint at its rear end through which propelling thrust is transmitted and which compensates for said tilting movement of the axle assembly.

6. In a automobile, in combination, a frame, a rear axle assembly including axle housing and differential, means pivotally supporting the rear end of the frame on the axle housing from a single point centrally between the sides of the frame whereby the rear axle assembly may tilt on said pivotal point, an engine mounted in the rear portion of the frame, a driving connection between the engine and differential permitting the rear axle assembly to move vertically with respect to the frame and to tilt about said point of support, and a thrust-rod between the rear axle assembly and the frame, the thrust-rod having a universal connection at its forward end with the frame and a pivotal connection at its rear end with the rear axle assembly, said pivotal connection being on a normally vertical axis perpendicular to the thrust-rod so as to permit tilting of the rear axle assembly about said pivotal connection with the frame and to establish a propelling thrust connection with the frame.

7. In an automobile, in combination, a frame, a rear axle assembly including a differential, means supporting the frame on the rear axle assembly from a point centrally disposed on the rear end of the frame whereby the rear axle assembly may tilt about a horizontally disposed axis coincident with said point of support, an engine on the frame, a driving connection between the engine and differential, and a thrust-rod pivotally connected at its forward end with the frame and pivotally connected at its rear end to the differential case on a normally vertical axis perpendicular to the thrust-rod, the latter pivotal connection including comparatively flat, coacting bearing surfaces between the thrust-rod and differential case disposed at right angles to said axis and substantially parallel with the thrust-rod to bear the propelling thrust between the thrust-rod and differential case and to permit tilting of the latter with the rear axle assembly about said suspension point on the frame.

8. In an automobile, in combination, a frame, a front axle and its guiding wheels, a rear axle assembly including the driving wheels, axle housing and the differential, a spring support between each side member of the frame near its front end and the adjacent end of the front axle providing two points of support, a transverse spring support pivotally attached to the rear cross-member of the frame at a central point and attached at its ends to the ends of the rear axle housing, an engine mounted in the rear part of the frame, a driving connection between the engine and differential permitting vertical and tilting movements of the rear axle assembly with respect to the frame, and a thrust-rod between the rear axle assembly and the frame.

9. An automobile chassis, comprising a front axle, a rear axle, a frame supported upon said axles, springs interposed between said frame and said axles, said frame having a three-point support on said springs with two points thereof at the front and one at the rear, the front support comprising two laterally spaced springs extending longitudinally of the frame, each attached at its front end to the front axle and at its rear end to the adjacent side member of the frame, the rear support comprising a transverse spring attached at its ends to the rear axle near the ends thereof and at an intermediate point to the rear portion of the frame, providing the third point of support, an engine mounted in the rear part of the frame and connected with the rear axle, and radius rods attached at their rear ends to the rear axle and at their forward ends to the frame forward of the engine.

10. In an automobile, in combination, a front and a rear axle, a frame, a three-point support for the frame on said axles, two of which points are in front and one in the rear, an engine mounted in the rear part of the frame, a propelling connection between the engine and rear axle comprising a driving chain and a car-pushing thrust connection arranged in juxtaposition, and radius rods attached to the end portions of the rear axle and at their forward ends with the frame near the forward end of the engine.

11. In an automobile, in combination, a frame, a rear axle assembly including axle housing and differential, means pivotally supporting the rear end of the frame on the axle housing from a single point centrally between the sides of the frame whereby the rear axle assembly may tilt on said pivotal point, an engine mounted in the rear portion of the frame, a driving connection between the engine and differential permitting the rear axle assembly to move vertically with respect to the frame and to tilt about said point of support, a thrust-rod between the rear axle assembly and the frame, the thrust-rod having a universal connection at its forward end with the frame and a pivotal connection at its rear end with the rear axle assembly, said pivotal connection being on a normally vertical axis perpendicular to the rod so as to permit tilting of the rear axle assembly about said pivotal connection with the frame and to establish a propelling thrust connection with the frame, and radius rods attached at their rear ends to the rear axle assembly and at their front ends to the frame at a position forward thereon.

12. In an automobile, in combination, a frame, a rear axle assembly including a differential, means supporting the frame on the rear axle assembly from a point centrally disposed on the rear end of the frame whereby the rear axle assembly may tilt about a horizontally disposed axis coincident with said point of support, an engine on the frame, a driving connection between the engine and differential, a thrust-rod pivotally connected at its forward end with the frame and pivotally connected at its rear end to the differential case on a normally vertical axis perpendicular to the thrust-rod, the latter pivotal connection including comparatively flat, coacting bearing surfaces between the thrust-rod and differential case disposed at right angles to said axis and substantially parallel with the thrust-rod to bear the propelling thrust between the thrust-rod and differential case and to permit tilting of the latter with the rear axle assembly about said suspension point on the frame, and radius rods connected to the ends of the rear axle assembly and to the frame at a forward central point, the latter connection including a swing plate pivotally connected to the frame so as to swing about a horizontally disposed fore-and-aft axis.

13. In an automobile, in combination, a frame, a rear axle assembly on which the frame is pivotally supported to tilt about a horizontally disposed axis disposed on the rear end of the frame, an engine mounted in the rear portion of the frame, a driving connection between the engine and rear axle which allows vertical movement and tilting of the rear axle assembly with respect to the frame, a thrust-rod connecting the rear axle assembly with the frame, through which rod the propelling thrust is transmitted and which allows said movements of the rear axle assembly, and a radius rod connected to each outer end of the rear axle assembly and pivotally connected forward on the frame.

14. In an automobile, in combination, a frame, a rear axle assembly on which the frame is pivotally supported to tilt about a horizontally disposed axis disposed on the rear end of the frame, an engine mounted in the rear portion of the frame, a driving connection between the engine and rear axle which allows vertical movement and tilting of the rear axle assembly with respect to the frame, a thrust-rod connecting the rear axle assembly with the frame, through which rod the propelling thrust is transmitted and which allows said movements of the rear axle assembly, and a radius rod connected to each outer end of the rear axle assembly and pivotally connected with the frame forward of the engine, the latter connection being through the agency of a swing-plate pivotally connected to the frame to swing about a horizontally disposed fore-and-aft axis.

15. In an automobile, in combination, a frame, a front axle and its guiding wheels, a rear axle assembly including the driving wheels, axle housing and the differential, a spring support between each side member of the frame near its front end and the adjacent end of the front axle providing two points of support, a transverse spring support pivotally attached to the rear cross-member of the frame at a central point and attached at its ends to the ends of the rear axle housing, an engine mounted in the rear part of the frame, a driving connection between the engine and differential permitting vertical and tilting movements of the rear axle assembly with respect to the frame, a thrust-rod between the rear axle assembly and the frame, and a radius rod attached to each end of the rear axle assembly and connected to the frame at a position forward thereon.

16. An automobile comprising, in combination, a frame, a front axle and its guiding wheels, a quarter-elliptic leaf-spring connected at its rear end to each side member of the frame rearward of the front cross-member and connected at its front end to the adjacent end of the front axle, a rear axle assembly and its driving wheels, two quarter-elliptic leaf-springs arranged transversely of the frame at the rear thereof and attached at their outer ends to the rear axle assembly, a pivotal connection between the rear springs and the rear cross-member of the frame on a horizontal axis centrally on said rear member, said front and rear springs providing a three-point support for the frame, an engine mounted in the rear portion of the frame and having a driving connection with the rear axle, and radius rods connecting the outer ends of the rear axle assembly with the frame at a position forward thereon.

17. An automobile comprising, in combination, a frame, a front axle and its guiding wheels, a quarter-elliptic leaf-spring connected at its rear end to each side member of the frame rearward of the front cross-member and connected at its front end to the adjacent end of the front axle, a rear axle assembly and its driving wheels, two quarter-elliptic leaf-springs arranged transversely of the frame at the rear thereof and attached at their outer ends to the rear axle assembly, a pivotal connection between the rear springs and the rear cross-member of the frame on a horizontal axis centrally on said rear member, said front and rear springs providing a three-point support for the frame, an engine mounted in the rear portion of the frame and having a driving connection with the rear axle, radius rods connecting the outer ends of the rear axle assembly with the frame at a central point thereon near the front of the engine, the driving connection between the engine and rear axle including an endless chain driving a sprocket on the driving member of the differential, and a thrust-rod connected at its rear end with the rear axle assembly and at its forward end with the frame coaxial with the forward chain sprocket.

18. An automobile chassis, comprising a front axle, a rear axle, a frame supported upon said axles, springs interposed between said frame and said axles, said frame having a three-point support on the springs with two points thereof at the front and one at the rear, an engine mounted in the rear part of the frame and having a driving connection with the rear axle, and a thrust-rod having a connection between the rear axle and the frame acting through the engine casing, the thrust rod having a universal joint connection with the engine casing and a hinge-joint at the rear thereof with the hinge axis in a vertical plane and transverse to the thrust-rod.

In witness whereof, I have hereunto set my hand at Indianapolis, Indiana, this 24th day of October, A. D. one thousand nine hundred and twenty three.

HARRY E. CROSS.